(12) United States Patent
Tao et al.

(10) Patent No.: US 11,889,297 B2
(45) Date of Patent: Jan. 30, 2024

(54) METHOD, APPARATUS AND SYSTEM FOR SERVICE CONTINUITY BETWEEN A 4G NETWORK AND A 5G NETWORK

(71) Applicant: Huawei Technologies Co., Ltd., Shenzhen (CN)

(72) Inventors: Zhenyu Tao, Shanghai (CN); Chuankui Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/557,592

(22) Filed: Dec. 21, 2021

(65) Prior Publication Data

US 2022/0117023 A1    Apr. 14, 2022

Related U.S. Application Data

(63) Continuation of application No. PCT/CN2020/096862, filed on Jun. 18, 2020.

(30) Foreign Application Priority Data

Jun. 21, 2019    (CN) .......................... 201910544804.0

(51) Int. Cl.
*H04W 76/16*    (2018.01)
*H04W 8/02*    (2009.01)
*H04W 88/16*    (2009.01)

(52) U.S. Cl.
CPC ............. *H04W 76/16* (2018.02); *H04W 8/02* (2013.01); *H04W 88/16* (2013.01)

(58) Field of Classification Search
CPC ....... H04W 76/16; H04W 8/02; H04W 88/16; H04W 60/04; H04W 36/0022;
(Continued)

(56) References Cited

U.S. PATENT DOCUMENTS

2017/0012947 A1    1/2017  Lee et al.
2018/0279214 A1    9/2018  Chandramouli et al.
(Continued)

FOREIGN PATENT DOCUMENTS

CN    101521871 A    9/2009
CN    102685715 A    9/2012
(Continued)

OTHER PUBLICATIONS

3GPP TS 23.060 V16.0.0 "3rd Generation Partnership Project; Technical Specification Group Services and System Aspects; General Packet Radio Service (GPRS); Service description; Stage 2 (Release 16)," Mar. 2019, 367 pages.
(Continued)

*Primary Examiner* — Afshawn M Towfighi
(74) *Attorney, Agent, or Firm* — Conley Rose, P.C.

(57) ABSTRACT

A service continuity implementation method, a related device, and a system, where a mobility management device may select a 5G gateway for a 5G user equipment handed over to a 4G network, and establish a session with the 5G gateway. The 5G gateway may send a 5G-related parameter to the user equipment in advance. Therefore, after the user equipment moves from the 4G network to a 5G network, service continuity is maintained, that is, a service in the 4G network continues to be maintained in the 5G network.

20 Claims, 6 Drawing Sheets

(58) Field of Classification Search
CPC ........... H04W 36/125; H04W 36/0055; H04W 36/0033; H04W 36/14; H04W 36/32
See application file for complete search history.

(56) References Cited

U.S. PATENT DOCUMENTS

| | | | |
|---|---|---|---|
| 2018/0376384 A1 | 12/2018 | Youn et al. | |
| 2020/0084675 A1* | 3/2020 | Lu | H04W 80/10 |
| 2020/0107401 A1 | 4/2020 | Kumar et al. | |
| 2020/0337014 A1* | 10/2020 | Liu | H04W 36/32 |
| 2020/0367190 A1* | 11/2020 | Wang | H04W 36/0072 |
| 2022/0053449 A1* | 2/2022 | Shan | H04W 4/40 |
| 2022/0095260 A1* | 3/2022 | Shan | H04W 60/04 |
| 2022/0338071 A1* | 10/2022 | Suh | H04W 8/24 |

FOREIGN PATENT DOCUMENTS

| | | |
|---|---|---|
| CN | 105828399 A | 8/2016 |
| CN | 107852600 A | 3/2018 |
| CN | 108307082 A | 7/2018 |
| CN | 108347748 A | 7/2018 |
| CN | 108632915 A | 10/2018 |
| CN | 108696872 A | 10/2018 |
| CN | 109155949 A | 1/2019 |
| WO | 2017171920 A1 | 10/2017 |
| WO | 2018171310 A1 | 9/2018 |
| WO | 2019074344 A1 | 4/2019 |

OTHER PUBLICATIONS

3GPP TS 23.502 V16.1.1 "3rd Generation Partnership Project; Technical Specification Group Services and System Aspects; Procedures for the 5G System; Stage 2 (Release 16)," Jun. 2019, 494 pages.

Huawei, et al., "Discussion on security of interworking with N26," 3GPP TSG SA WG3 (Security) Meeting #89 S3-173232, Nov. 27-Dec. 1, 2017, Reno, USA, 3 pages.

NTT Docomo, "TS 23.502: Registration and PDU session establishment procedures changes for EPS to NGS idle mode mobility," SA WG2 Meeting #120 S2-172244, Mar. 27-31, 2017, Busan, South Korea, 12 pages.

Meng, R., et al., "Research on Causes Optimization in the Procedures of Mobile Communication," Designing Techniques of Posts and Telecommunications, Dec. 19, 2016, with an English abstract, 6 pages.

Samsung, "Supporting 4G-only UEs with SMF/PGW-C," S2-1907311, Jun. 2019, 1 page.

3GPP TS 23.401 V16.3.0, Jun. 2019, "Technical Specification 3rd Generation Partnership Project; Technical Specification Group Services and System Aspects; General Packet Radio Service(GPRS) enhancements for Evolved Universal Terrestrial Radio Access Network (E-UTRAN) access (Release 16)," Jun. 11, 2019, 422 pages.

3GPP TS 23.502 V16.0.2, Apr. 2019, "Technical Specification 3rd Generation Partnership Project; Technical Specification Group Services and System Aspects; Procedures for the 5G System; Stage 2 (Release 16)," Apr. 1, 2019, 419 pages.

NTT Docomo et al., "Single-registration with no Nx," SA WG2 Meeting #122, S2-174568, Jun. 26-30, 2017, Cabo, Mexico, 15 Pages.

Cisco, "MME and AMF registration in HSS+UDM", 3GPP TSG-SA2 Meeting #125 S2-180804, Guthenburg, Sweden, Jan. 22-26, 2018, 12 pages.

Cisco, "MME and AMF registration in HSS+UDM", 3GPP TSG-SA2 Meeting #125 S2-180119, Guthenburg, Sweden, Jan. 22-26, 2018, 11 pages.

* cited by examiner

FIG. 5

METHOD, APPARATUS AND SYSTEM FOR SERVICE CONTINUITY BETWEEN A 4G NETWORK AND A 5G NETWORK

CROSS-REFERENCE TO RELATED APPLICATIONS

This application is a continuation of International Patent Application No. PCT/CN2020/096862, filed on Jun. 18, 2020, which claims priority to Chinese Patent Application No. 201910544804.0, filed on Jun. 21, 2019. The disclosures of the aforementioned applications are hereby incorporated by reference in their entireties.

TECHNICAL FIELD

This application relates to the field of communication technologies, and in particular, to a service continuity implementation method, a related apparatus, and a system.

BACKGROUND

In an existing mobile communication network, coverage of a $2^{nd}$ generation (2G) or $3^{rd}$ generation (3G) network (2/3G) is wider than coverage of a $4^{th}$ generation (4G) network, and the coverage of the 4G network is wider than that of an initial $5^{th}$ generation (5G) network. To ensure service continuity (for example, uninterruptedness of a data service of a user) when a 5G user moves out of the coverage of the 5G network, a network operator usually overlays the 5G network within the coverage of the 4G network. Therefore, when a user equipment moves, the user equipment generally moves from the 5G network area to the 4G network area, and then moves to the 2/3G network area. Alternatively, the user equipment performs access in the 2/3G network area, then moves to the 4G network area, and then moves to the 5G network area.

A conventional technology provides a method used by a user equipment to move between a 2/3G network and a 4G network to implement service continuity. However, if the user equipment moves to the 4G network after accessing the 2/3G network, and then moves from the 4G network to a 5G network, the UE needs to access the 5G network again. As a result, services used by the UE in the 4G network are interrupted and service continuity cannot be maintained.

SUMMARY

Embodiments of this application provide a service continuity implementation method, to resolve a service interruption problem caused by movement of a user equipment from a 2/3G network to a 4G network and then to a 5G network.

According to a first aspect, an embodiment of this application provides a service continuity implementation method, where the method is applied to a mobility management device in a communication network, and main steps include the following.

A mobility management device receives a tracking area update request message for a 4G network sent by user equipment, where the request message carries a user identifier and a 5G capability of the user equipment. Then, if the mobility management device determines, based on the user identifier, that a user is a 5G user, the mobility management device triggers the user equipment to attach to the 4G network. The UE re-initiates an attach procedure, and the mobility management device receives an attach request sent by the user equipment, selects a 5G gateway for the user equipment, and establishes a session with the 5G gateway.

In the method provided in the embodiments, the mobility management device may select a 5G gateway for 5G user equipment handed over to the 4G network, and establish a session with the 5G gateway. The 5G gateway may send a 5G-related parameter to the user equipment in advance. Therefore, after the user equipment moves from the 4G network to a 5G network, service continuity is maintained, that is, a service in the 4G network continues to be maintained in the 5G network.

In an optional implementation, the following method may be used for the mobility management device to trigger the user equipment to attach to the 4G network.

The mobility management device sends a tracking area update reject message to the user equipment, to reject tracking area update of the user equipment. Alternatively, the mobility management device detaches the user equipment, that is, sends a detach request message to the user equipment. Through the foregoing triggering procedure, the user equipment performs a 4G network attach procedure.

In an optional implementation, the following method may be used for the mobility management device to determine, based on the user identifier, that the user is a 5G user.

The mobility management device obtains subscription data of the user from a user database server based on the user identifier, and then determines, based on the subscription data, that the user is a 5G user.

In an optional implementation, the mobility management device may determine, based on the tracking area update request message, that the user equipment moves from a 2/3G network to the 4G network, to perform a subsequent procedure of triggering the attachment of the user equipment.

In an optional implementation, after sending the tracking area update reject message, the mobility management device may further send a request message for deleting a session of the user equipment to a 4G gateway, to save resources of the 4G gateway.

In an optional implementation, before the mobility management device detaches the user equipment, the method may further include the following steps.

The mobility management device establishes a session with a 4G gateway based on the location area update request message, and sends a tracking area update accept message to the user equipment, to complete a tracking area update procedure of the user equipment. After the tracking area update of the user equipment is completed, the mobility management device may initiate a detach procedure to the user equipment.

In an optional implementation, the mobility management device may further obtain a user context from a 2/3G gateway based on the location area update request message, and then switch a bearer of the user equipment from the 2/3G gateway to a 4G gateway based on the user context, to keep an Internet Protocol (IP) address of the user equipment unchanged.

According to a second aspect, an embodiment of this application provides a mobility management device, where the device includes the following function modules: a first receiving module, a determining module, an attach triggering module, a selection module, and a session establishment module.

The first receiving module may be configured to receive a tracking area update request message for a 4G network sent by a user equipment, where the request message carries a user identifier and a 5G capability of the user equipment.

The determining module is configured to determine, based on the user identifier, that a user is a 5G user. The attach triggering module is configured to trigger the user equipment to attach to the 4G network. The first receiving module is further configured to receive an attach request sent by the user equipment.

The selection module is configured to select a 5G gateway for the user equipment. The session establishment module is configured to establish a session with the 5G gateway.

The mobility management device provided in this embodiment can implement service continuity of the user equipment through cooperation among the first receiving module, the determining module, the attach triggering module, the selection module, and the session establishment module in the foregoing service continuity implementation method. This resolves a problem of service interruption caused in other approaches by movement of the user equipment from the 2/3G network to the 4G network and then from the 4G network to the 5G network.

In an optional implementation, that the attach triggering module in the mobility management device triggers the user equipment to attach to the 4G network may include the following.

The attach triggering module sends a tracking area update reject message to the user equipment, to reject tracking area update of the user equipment.

In addition, the attach triggering module may also detach the user equipment, for example, send a detach request to the user equipment.

In an optional implementation, the determining module in the mobility management device may include: an obtaining submodule configured to obtain subscription data of the user from a user database server based on the user identifier; and a determining submodule configured to determine, based on the subscription data, that the user is a 5G user.

In an optional implementation, the mobility management device may further include: a session deletion module configured to: after the attach triggering module sends the tracking area update reject message to the user equipment, send a request message for deleting a session of the user equipment to a 4G gateway. In this way, the gateway may delete the session of the user equipment stored in the gateway.

In an optional implementation, the determining module in the mobility management device is further configured to determine, based on the received tracking area update request message, that the user equipment moves from a 2/3G network to the 4G network.

In an optional implementation, the session establishment module in the mobility management device is further configured to: before the user equipment is triggered to perform detach, establish a session with a 4G gateway based on the location area update request message; and send a tracking area update accept message to the user equipment after the session establishment is completed, to complete a tracking area update procedure of the user equipment.

In an optional implementation, the mobility management device may further include: a context obtaining module configured to obtain a user context from a 2/3G gateway based on the received location area update request message; and a switching module configured to switch a bearer of the user equipment from the 2/3G gateway to a 4G gateway based on the user context.

According to a third aspect, an embodiment of this application provides a mobility management device, including a non-volatile memory and a processor that are coupled to each other, where the processor invokes program code stored in the memory to perform some or all steps of any method in the first aspect.

According to a fourth aspect, an embodiment of this application provides a communication system, and the communication system mainly includes the mobility management device described in the second aspect or the third aspect and a 5G gateway.

For example, the mobility management device in the communication system is configured to: receive a tracking area update request message for a 4G network sent by user equipment, where the tracking area update request message carries a user identifier and a 5G capability of the user equipment; determine, based on the user identifier, that a user is a 5G user, and trigger the user equipment to attach to the 4G network; and receive an attach request sent by the user equipment, select a 5G gateway for the user equipment, and establish a session with the 5G gateway.

The 5G gateway in the communication system is configured to establish a session with the mobility management device.

In an optional implementation, the communication system may further include user equipment, a user database server, and the like.

According to a fifth aspect, an embodiment of this application provides a computer-readable storage medium. The computer-readable storage medium stores program code, where the program code includes instructions used to perform a part or all of steps of any method according to the first aspect to the fourth aspect.

According to a sixth aspect, an embodiment of this application provides a computer program product. When the computer program product runs on a computer, the computer is enabled to perform a part or all of steps of any method according to the first aspect to the fourth aspect.

In the embodiment described in any one of the foregoing aspects, the user identifier may be a globally unique temporary identity, an international mobile subscriber identity, a mobile subscriber number, an Integrated Services Digital Network (ISDN) number, or an international mobile equipment identity of the user.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

Figure 1:
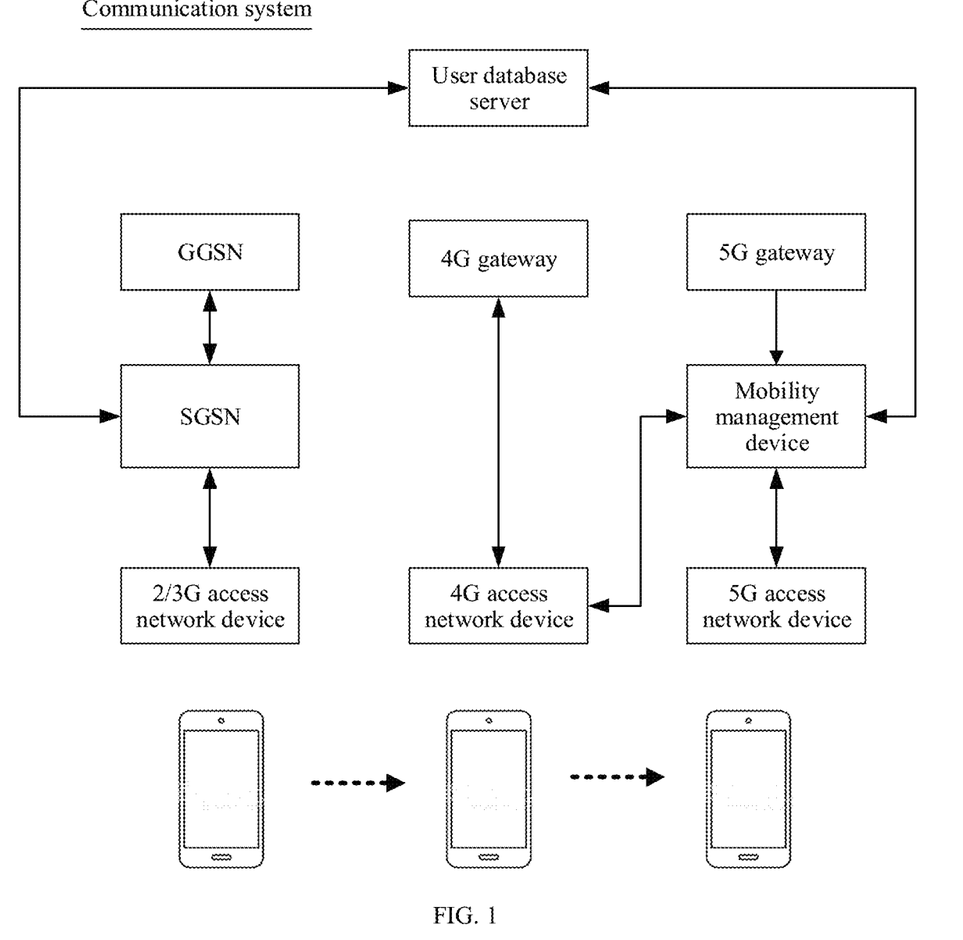
FIG. 1 is a schematic diagram of a communication system according to an embodiment of this application.

FIG. 1 is a schematic diagram of a communication system according to an embodiment of this application.

The communication system provided in this embodiment of this application includes a 2/3G network, a 4G network, and a 5G network. User equipment (UE) may access the 2/3G network via a 2/3G access network device, access the 4G network via a 4G access network device, or access the 5G network via a 5G access network device. The access network device may include a base station or the like. The 2G network includes a Global System for Mobile Communications (GSM) network and a code-division multiple access (CDMA) network, and the 3G network includes wideband code-division multiple access (WCDMA), a CDMA2000 network, a time-division synchronous code-division multiple access (TD-SCDMA) network. The 4G network includes a Long-Term Evolution (LTE) network. The 5G network includes a new radio (NR) network, and the like.

A serving General Packet Radio Service (GPRS) support node (SGSN) is mainly used for mobility management of a UE in the 2G and 3G networks. A gateway GPRS support node (GGSN) is mainly used for session management and UE data forwarding in the 2G and 3G networks. The SGSN and the GGSN may be collectively referred to as 2/3G gateways. The SGSN can be deployed independently or together.

A mobility management device may also be referred to as a mobility management entity (MME), and is mainly responsible for a positioning process, a paging process, and the like of a UE in an idle mode in the 4G network.

In this embodiment, a 4G gateway includes a packet data network (PDN) gateway (PGW) configured to forward data of the user equipment to the Internet or forward data of the Internet to the UE. In addition, the 4G gateway may further include a serving gateway (SGW).

In this embodiment, a 5G gateway includes a session management function (SMF) device, which may implement session management on a UE accessing the 5G network.

In addition, the 5G gateway may alternatively be a converged gateway that integrates functions of the GGSN, the SGW, the PGW, and the SMF. If the 5G gateway is deployed with a control plane and a user plane separated, the 5G gateway in this embodiment may be a device that integrates control plane functions of the SMF and the GGSN, a control plane function of the SGW, and a control plane function of the PGW.

The subscriber database server may store subscription data of a user, and the subscriber data server may integrate functions of a unified data management (UDM) device, a home subscriber server (HSS), and a home location register (HLR), or may have independent functions of the UDM and the HSS.

In the communication system provided in this embodiment, a UE supporting the 5G network first accesses the network using the 2/3G access network, and then the UE moves to the 4G network. In this case, the UE initiates a location update procedure. That is, the UE sends a tracking area update (TAU) request message to the MME.

After receiving the TAU request message, the MME determines, based on a 5G network capability parameter carried in the TAU request message, that the UE supports 5G network access, and further determines whether a user corresponding to the UE is a 5G user (that is, whether the user has subscribed to a 5G service). If the user is a 5G user, the UE is triggered to attach to the 4G network. The UE then initiates a 4G network attach procedure. After receiving an attach request sent by the UE, the MME selects, for the UE, a 5G gateway supporting a 5G capability, and establishes a session with the 5G gateway. The 5G gateway may send a 5G-related parameter (for example, quality of service (QoS) and a traffic flow template) to the user equipment in advance, such that service continuity is maintained after the UE moves from the 4G network to the 5G network. That is, services (such as video calls and online videos) on the 4G network continue to be maintained on the 5G network, improving user experience.

To understand the embodiments of this application in detail, the following provides a detailed method procedure to describe the service continuity implementation method provided in this application.

Figure 2A:
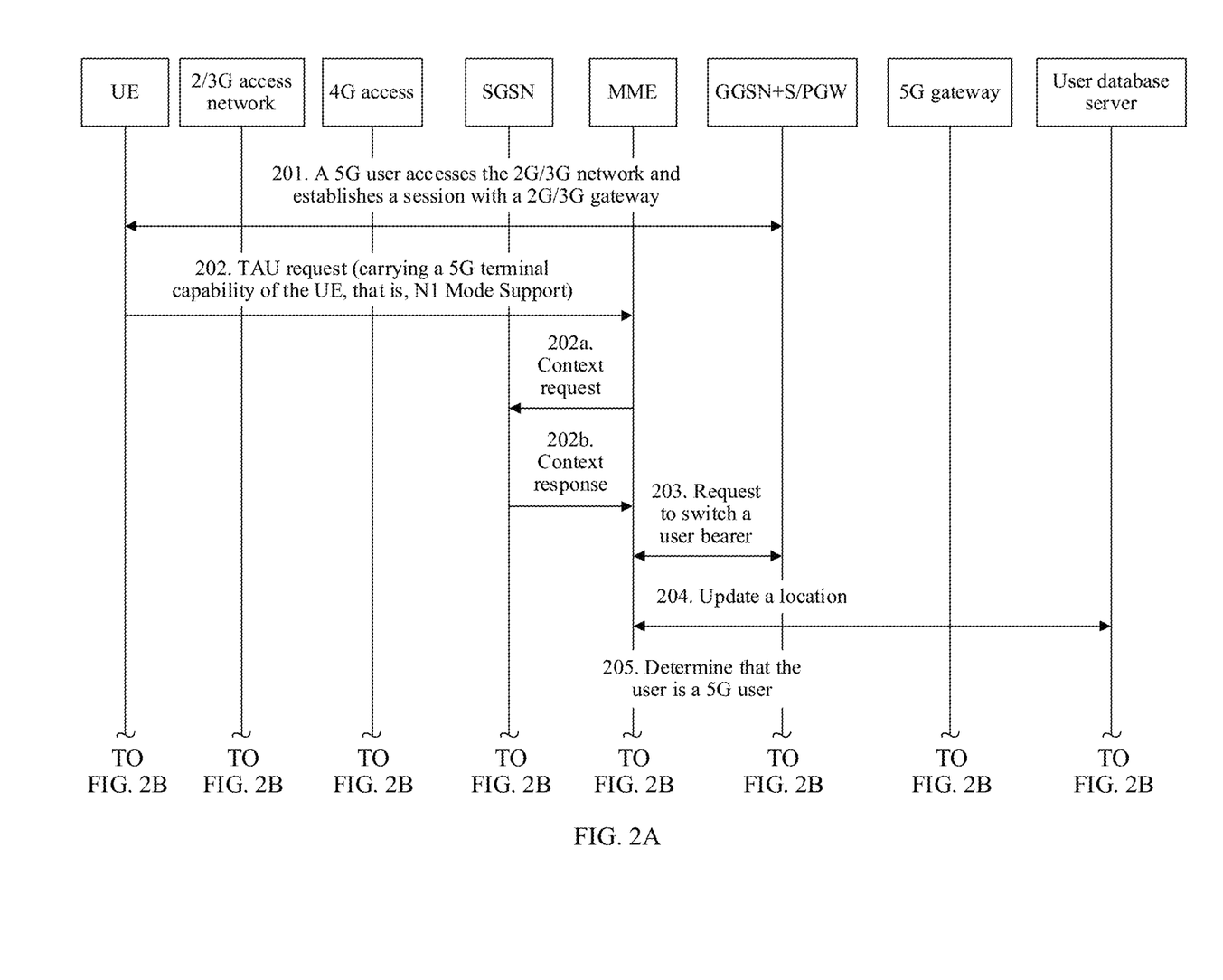
FIG. 2A and FIG. 2B are a flowchart of a service continuity implementation method according to an embodiment of this application.
Figure 2B:
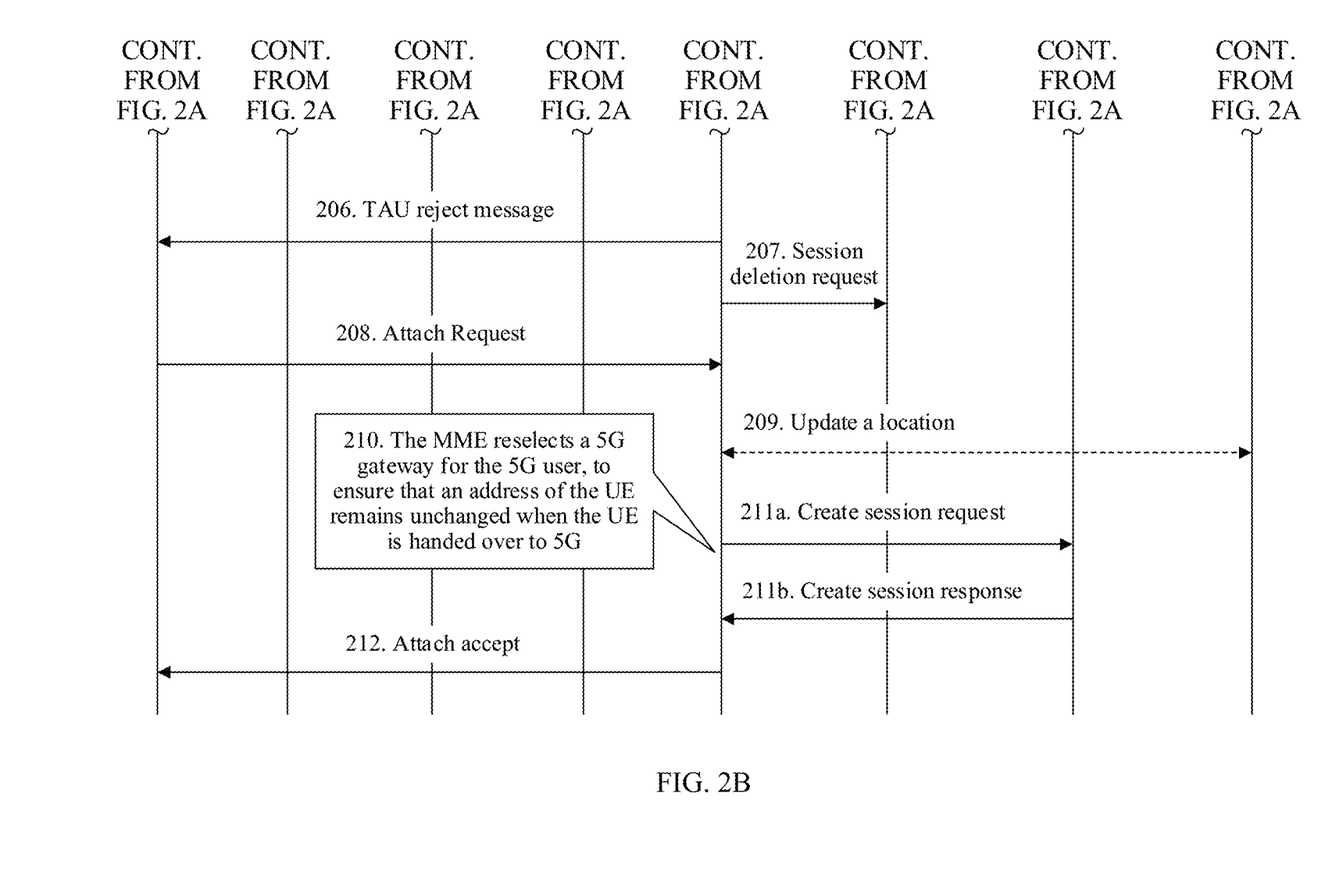

FIG. 2A and FIG. 2B are a flowchart of a service continuity implementation method according to an embodiment of this application.

The method provided in this embodiment mainly includes the following steps.

Step 201. 5G user equipment accesses a 2/3G network, and establishes a session with a GGSN.

In this embodiment, the UE first accesses the 2/3G network, for example, when a user is in a location such as an elevator or a garage. After accessing the 2/3G network, the UE establishes a session with a 2/3G gateway. The UE can use services provided by the 2/3G network.

In this embodiment, the 2/3G gateway includes an SGSN and the GGSN. The GGSN and a 4G gateway are deployed together, and the SGSN is deployed independently of the GGSN.

If the UE moves to an area covered by a 4G network, the UE accesses a 4G access network. The 4G access network is an LTE network.

Step 202. The UE sends a location update request message to an MME.

After accessing the LTE network, the UE sends a TAU request message (or TAU request for short) to the MME. The TAU request message carries a user identifier and a 5G capability of the UE. In addition, the TAU request message may further carry a tracking area identifier of the UE.

The 5G capability of the UE may be carried using a UE Network Capability parameter in the TAU request. For example, if a value of this parameter is N1 mode support, it indicates that the UE has a 5G capability, that is, the UE supports 5G network access.

In addition, the TAU request may further carry a UE status information element, and the MME determines that the UE moves from the 2/3G network to the 4G network based on the information element. For example, if the TAU request does not carry the UE status information element, the MME may determine that the UE moves from the 2/3G network to the 4G network.

After determining that the UE moves from the 2/3G network to the 4G network, the MME performs a procedure of switching a bearer of the UE from the 2/3G network to the 4G network, which includes steps 202a, 202b, and 203.

Steps 202a and 202b. The MME requests a user context from the SGSN.

Step 203. The MME requests the 4G gateway to switch the bearer of the user from the GGSN to the 4G gateway.

In this embodiment, the 4G gateway includes an SGW and a PGW. The 4G gateway and the GGSN are deployed together.

Step 204. The MME initiates location update to a user database server.

After switching the bearer of the UE from the GGSN to the 4G gateway, the MME initiates the location update to the user database server.

The MME may send a location update request message to the user database server, where the location update request message carries the user identifier. The user identifier may be a globally unique temporary identity, an international mobile subscriber identity, a mobile subscriber ISDN number, or an international mobile equipment identity.

The user database server records a location of the UE, obtains subscription data of the user based on the user identifier, and then sends a location update response message to the MME, where the response message carries the subscription data of the user. For example, the subscription data carries 5G subscription information indicating whether entering a 5G core network is allowed (Core Network Restriction parameter) and a capability of whether switching a bearer to 5G is allowed (Interworking 5GS Indicator parameter).

Step 205. The MME determines that the user corresponding to the UE is a 5G user.

In this embodiment, the subscription data carries information indicating that the user has subscribed to a 5G service. Therefore, the MME may determine that the user corresponding to the UE is a 5G user. If the subscription data does not carry the information related to the 5G service, that is, the UE has not subscribed to the 5G service, the MME determines that the user is a non-5G user, and performs a normal TAU procedure.

Step 206. The MME returns a TAU reject message to the UE, to reject tracking area update of the UE.

In this embodiment, the MME triggers, by sending the TAU reject message to the UE, the UE to attach to the 4G network, where the message may carry a cause value, for example, implicitly detached.

After receiving the TAU reject message, the UE re-initiates a request of attaching to the 4G network.

Step 207. The MME sends request information for deleting a session of the UE to the 4G gateway.

In this embodiment, the MME sends a session deletion request to the 4G gateway, requesting to delete the session of the UE on the 4G gateway. The PGW and the SGW delete their local UE sessions (or deactivate the bearer of the UE).

Step 208. The MME receives an attach request sent by the UE.

The attach request may carry the 5G capability of the UE.

In this embodiment, if the MME that receives the attach request is different from the MME that previously sends the TAU reject message, the MME that receives the attach request may further perform step 209, to obtain the subscription data of the user.

If the MME that receives the attach request is the same as the MME that previously sends the TAU reject message, step 209 is not performed, and step 210 is performed.

Step 209. The MME sends location update to the user database server.

For a location update process, refer to step 204. After obtaining the subscription data of the user, the MME may further determine whether the user corresponding to the UE is a 5G user. If yes, step 210 is performed.

If the user corresponding to the UE is not a 5G user, an attach procedure in a conventional technology is performed, to select a 4G gateway for the UE.

Step 210. The MME selects a 5G gateway for the user equipment.

Step 211. The MME establishes a session with the 5G gateway.

The step of establishing the session by the MME includes: step 211a. The MME sends a create session request to the 5G gateway; and step 221b. the 5G gateway returns a create session response to the MME, where the response may carry a 5G-related parameter, such as quality of service (QoS) and a traffic flow template (TFT).

Step 212. After establishing the session with the 5G gateway, the MME returns an attach accept message to the UE, such that the UE completes a subsequent 4G network attach procedure.

In this embodiment, after the MME selects the 5G gateway for the UE, an address of the UE may remain unchanged after the UE subsequently moves to the 5G network, such that a service is kept uninterrupted.

Figure 3A:
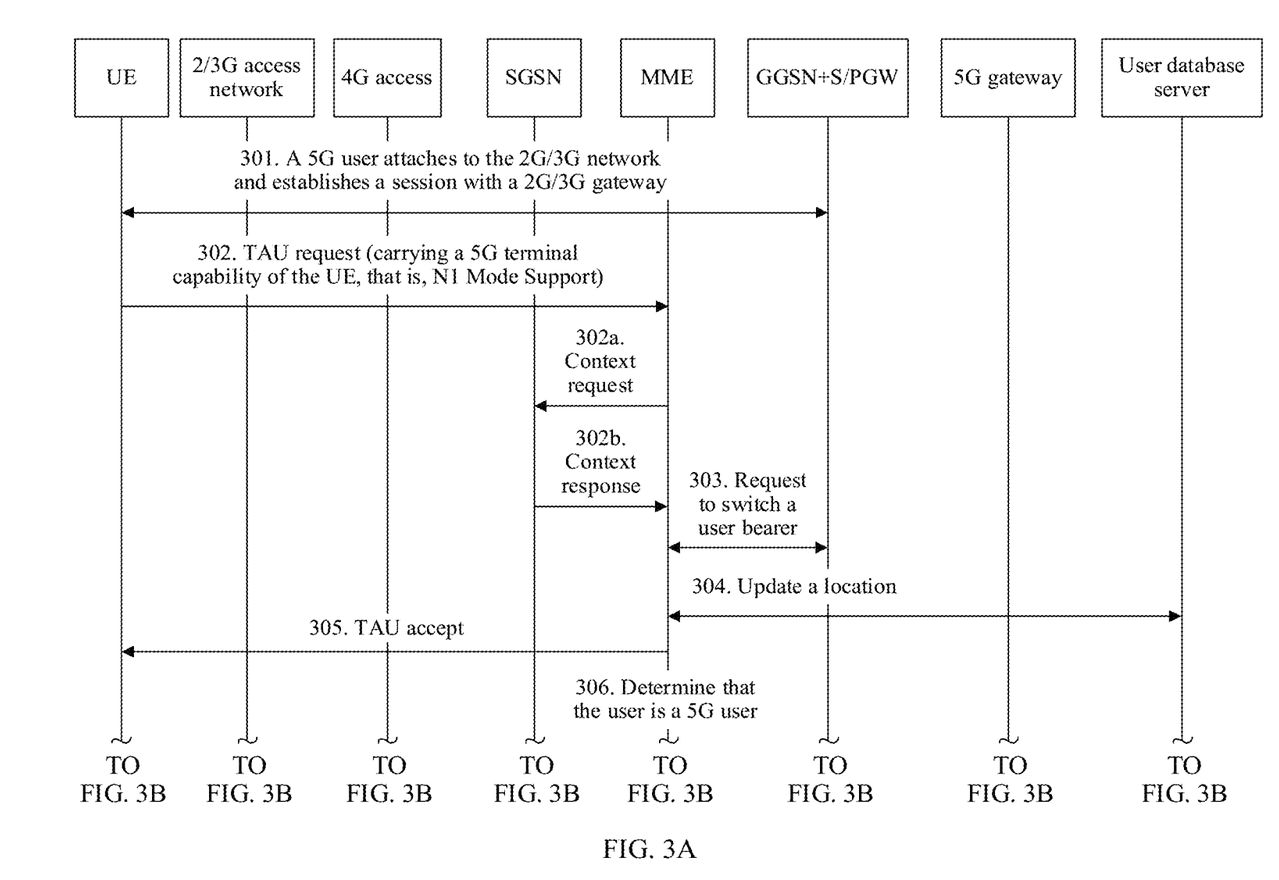
FIG. 3A and FIG. 3B are a flowchart of another service continuity implementation method according to an embodiment of this application.
Figure 3B:
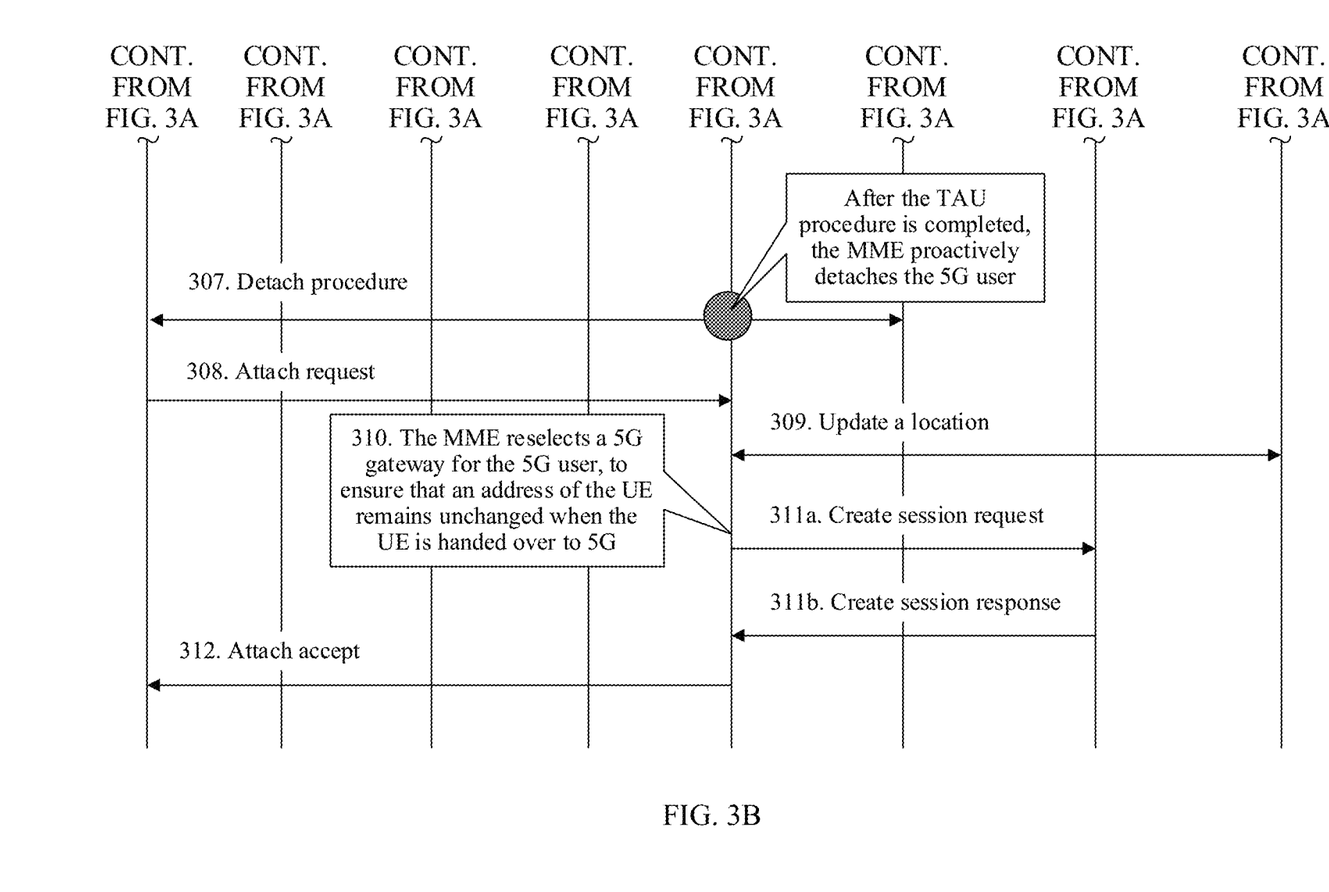

FIG. 3A and FIG. 3B are a flowchart of another service continuity implementation method according to an embodiment of this application.

The service continuity implementation method provided in this embodiment mainly includes the following steps.

Step 301. 5G user equipment accesses a 2/3G network, and establishes a session with a GGSN.

Step 302. The UE sends a location update request message to an MME.

Steps 302a and 302b. The MME requests a user context from an SGSN.

Step 303. The MME requests a 4G gateway to switch a bearer of a user from the GGSN to the 4G gateway.

Step 304. The MME initiates location update to a user database server.

An execution process of steps 301 to 304 is the same as that of steps 201 to 204 in the foregoing embodiment. For details, refer to the foregoing embodiment. Details are not repeated herein.

After completing the location update, the MME returns a TAU accept message to the UE.

Step 305. The MME sends the TAU accept message to the UE.

Step 306. The MME determines that the user corresponding to the UE is a 5G user.

In this embodiment, the subscription data carries information indicating that the user has subscribed to a 5G service. Therefore, the MME may determine that the user corresponding to the UE is a 5G user. If the subscription data does not carry the information related to the 5G service, that is, the UE has not subscribed to the 5G service, the MME determines that the user is a non-5G user.

Step 307. The MME detaches the UE.

In this embodiment, the MME triggers, by detaching the UE, the UE to attach to the 4G network.

For example, the MME may send a detach request to the UE, where the detach request carries a specified attach type, for example, re-attach required. In addition, the MME further sends a detach request to the 4G gateway, such that the 4G gateway may delete a session created for the UE, to save system resources.

After receiving the detach request, the UE re-initiates a request of attaching to the 4G network.

Step 308. The MME receives an attach request sent by the UE.

The attach request may carry the 5G capability of the UE.

In this embodiment, if the MME that receives the attach request is different from the MME that previously sends the TAU reject message, the MME that receives the attach request may further perform step 309, to obtain the subscription data of the user.

If the MME that receives the attach request is the same as the MME that previously sends the TAU reject message, step 309 is not performed, and step 310 is performed.

Step 309. The MME sends location update to the user database server.

For a location update process, refer to step 204. After obtaining the subscription data of the user, the MME may further determine whether the user corresponding to the UE is a 5G user. If yes, step 310 is performed.

If the user corresponding to the UE is not a 5G user, an attach procedure in a conventional technology is performed, to select a 4G gateway for the UE.

Step 310. The MME selects a 5G gateway for the user equipment.

Step 311. The MME establishes a session with the 5G gateway.

Step 312. After establishing the session with the 5G gateway, the MME returns an attach accept message to the UE, such that the UE completes a subsequent 4G network attach procedure.

An execution process of steps 310 to 312 is the same as that of steps 210 to 212 in the foregoing embodiment. For details, refer to the foregoing embodiment. Details are not repeated herein.

In this embodiment, after the MME selects the 5G gateway for the UE, an address of the UE may remain unchanged after the UE subsequently moves to the 5G network, such that a service is kept uninterrupted.

Figure 4:
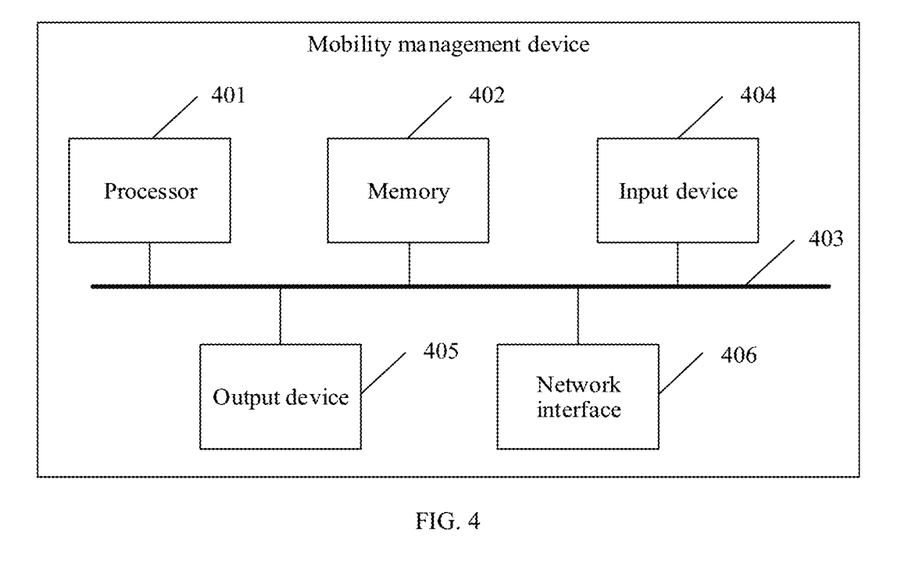
FIG. 4 is a schematic diagram of a mobility management device according to an embodiment of this application.

FIG. 4 is a schematic diagram of a mobility management device according to an embodiment of this application.

The mobility management device provided in this embodiment uses general-purpose computer hardware, including a processor 401, a memory 402, a bus 403, an input device 404, and an output device 405.

For example, the memory 402 may include computer storage media in a form of a volatile and/or nonvolatile memory, such as a read-only memory and/or a random-access memory. The memory 402 may store an operating system, an application program, another program module, executable code, program data, user registration data, user subscription data, and the like.

The input device 404 may be configured to enter a command and information to the mobility management device. The input device 404 may be a keyboard or a pointing device, such as a cursor mouse, a trackball, a touchpad, a microphone, a joystick, a play mat, a satellite dish, a scanner, or a similar device. The input devices may be connected to the processor 401 using the bus 403.

The output device 405 may be used by the mobility management device to output information. The output device 405 may be a monitor, or may be other peripheral output devices, such as a loudspeaker and/or a printing device, and the output devices may be connected to the processor 401 using the bus 403.

The mobility management device may be connected to a network through a network interface 406, for example, connected to a local area network (LAN). In a network connection environment, computer-executable instructions stored in the mobility management device may be stored in a remote storage device, and are not limited to being locally stored.

When the processor 401 in the mobility management device executes the executable code or the application program stored in the memory 402, the mobility management device may perform the method steps on the mobility management device side in the foregoing embodiments, for example, perform steps 203, 204, 206, 303, 304, and 307. For an execution process, refer to the foregoing embodiments. Details are not described herein again.

Figure 5:
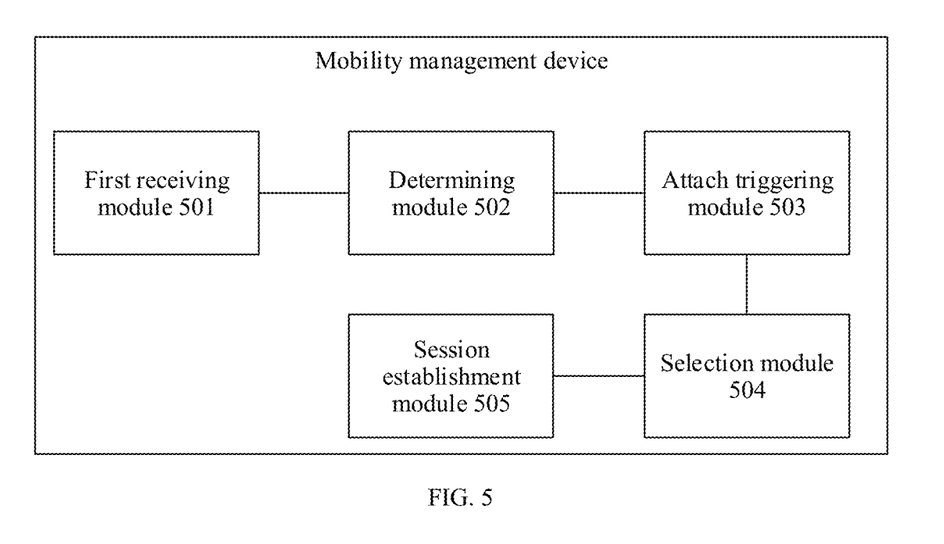
FIG. 5 is a schematic diagram of another mobility management device according to an embodiment of this application.

FIG. 5 is a schematic diagram of a mobility management device according to an embodiment of this application.

As shown in the figure, the mobility management device may include a first receiving module 501, a determining module 502, an attach triggering module 503, a selection module 504, and a session establishment module 505.

The first receiving module 501 may be configured to receive a tracking area update request message for a 4G network sent by user equipment, where the request message carries a user identifier and a 5G capability of the user equipment.

The determining module 502 is configured to determine, based on the user identifier, that a user is a 5G user.

The attach triggering module 503 is configured to trigger the user equipment to attach to the 4G network. The first receiving module 501 is further configured to receive an attach request sent by the user equipment.

The selection module 504 is configured to select a 5G gateway for the user equipment.

The session establishment module 505 is configured to establish a session with the 5G gateway.

The mobility management device provided in this embodiment can implement service continuity of the user equipment through cooperation among the first receiving module 501, the determining module 502, the attach triggering module 503, the selection module 504, and the session establishment module 505 in the foregoing service continuity implementation method in the foregoing embodiments. This resolves a problem in other approaches of service interruption caused by movement of the user equipment from the 2/3G network to the 4G network and then from the 4G network to the 5G network.

In the mobility management device provided in this application, that the attach triggering module 503 triggers the user equipment to attach to the 4G network may include: The attach triggering module 503 sends a tracking area update reject message to the user equipment, to reject tracking area update of the user equipment.

In addition, the attach triggering module 503 may also detach the user equipment, for example, send a detach request to the user equipment.

In the mobility management device provided in this application, the determining module 502 may include: an obtaining submodule configured to obtain subscription data of the user from a user database server based on the user identifier; and a determining submodule configured to determine, based on the subscription data, that the user is a 5G user.

The mobility management device provided in this application may further include a session deletion module configured to: after the attach triggering module 503 sends the tracking area update reject message to the user equipment, send a request message for deleting a session of the user equipment to a 4G gateway. In this way, the gateway may delete the session of the user equipment stored in the gateway.

The mobility management device in the foregoing embodiment is presented in a form of functional modules. The "module" herein may be an application-specific integrated circuit, a processor and a memory that execute one or more software or firmware programs, an integrated logic circuit, and/or another component that can provide the foregoing functions.

In the mobility management device provided in the foregoing embodiment, functions implemented by function modules such as the determining module 502 and the selection module 504 in the mobility management device may all be implemented using the processor 401 and the memory 402 in FIG. 4. For example, a function of determining, by the determining module 502 based on the user identifier, that the user is a 5G user may be implemented by the processor 401 by executing the code stored in the memory 402. A function of selecting the 5G gateway for the user equipment by the selection module 504 may also be implemented by the processor 401 by executing the code stored in the memory 402.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service continuity implementation method, comprising:
   receiving, by a mobility management device, a tracking area update request message for a $4^{th}$ generation (4G) network from a user equipment, wherein the tracking area update request message carries a user identifier and a $5^{th}$ generation (5G) capability of the user equipment;
   triggering the user equipment to attach to the 4G network after determining, by the mobility management device based on the user identifier, that a user corresponding to the user equipment is a 5G user;
   receiving, by the mobility management device, an attach request from the user equipment;
   selecting, by the mobility management device in response to the attach request, a 5G gateway for the user equipment; and
   establishing a session with the 5G gateway.

2. The service continuity implementation method according to claim 1, wherein triggering the user equipment to attach to the 4G network comprises sending, by the mobility management device, a tracking area update reject message to the user equipment to reject a tracking area update of the user equipment.

3. The service continuity implementation method according to claim 1, wherein triggering the user equipment to attach to the 4G network comprises detaching, by the mobility management device, the user equipment.

4. The service continuity implementation method according to claim 1, wherein determining that the user is the 5G user comprises:
   obtaining, by the mobility management device, subscription data of the user from a user database server based on the user identifier; and
   determining, by the mobility management device based on the subscription data, that the user is the 5G user.

5. The service continuity implementation method according to claim 1, further comprising determining, by the mobility management device based on a tracking area update request message, that the user equipment has moved from a 2nd/3rd generation (2/3G) network to the 4G network.

6. The service continuity implementation method according to claim 2, wherein after sending the tracking area update reject message, the service continuity implementation method further comprises sending, by the mobility management device, a request message to a 4G gateway for deleting another session of the user equipment.

7. The service continuity implementation method according to claim 3, wherein before detaching the user equipment, the service continuity implementation method further comprises:
   establishing, by the mobility management device, another session with a 4G gateway based on the tracking area update request message; and
   sending a tracking area update accept message to the user equipment.

8. The service continuity implementation method according to claim 2, further comprising:
   obtaining, by the mobility management device, a user context from a 2nd/3rd generation (2/3G) gateway based on the tracking area update request message; and
   switching, by the mobility management device, a bearer of the user equipment from the 2/3G gateway to a 4G gateway based on the user context.

9. The service continuity implementation method according to claim 3, further comprising:
   obtaining, by the mobility management device, a user context from a 2/3G gateway based on the tracking area update request message; and
   switching, by the mobility management device, a bearer of the user equipment from the 2/3G gateway to a 4G gateway based on the user context.

10. A mobility management device, comprising:
    a non-volatile memory; and
    a processor coupled to the memory and configured to execute instructions stored in the memory to:
      receive a tracking area update request message for a 4th generation (4G) network from a user equipment, wherein the request message carries a user identifier and a 5th generation (5G) capability of the user equipment;
      determine, based on the user identifier, that a user corresponding to the user equipment is a 5G user;
      trigger the user equipment to attach to the 4G network;
      receive an attach request from the user equipment;
      select a 5G gateway for the user equipment responsive to the attach request; and
      establish a session with the 5G gateway.

11. The mobility management device according to claim 10, wherein the processor triggers the user equipment to attach to the 4G network by sending a tracking area update reject message to the user equipment to reject a tracking area update of the user equipment.

12. The mobility management device according to claim 10, wherein the processor triggers the user equipment to attach to the 4G network by detaching the user equipment.

13. The mobility management device according to claim 10, wherein the processor determines that the user is the 5G user by:
    obtaining subscription data of the user from a user database server based on the user identifier; and
    determining, based on the subscription data, that the user is the 5G user.

14. The mobility management device according to claim 10, wherein the processor executes the instructions further to determine, based on the tracking area update request message, that the user equipment has moved from a 2nd/3rd generation (2/3G) network to the 4G network.

15. The mobility management device according to claim 11, wherein the processor executes the instructions further such that after sending the tracking area update reject message to the user equipment, the processor sends a request message for deleting another session of the user equipment to a 4G gateway.

16. The mobility management device according to claim 12, wherein the processor executes the instructions further to:

establish, before detaching the user equipment, another session with a 4G gateway based on the tracking area update request message; and send a tracking area update accept message to the user equipment.

17. The mobility management device according to claim 11, wherein the processor executes the instructions further to:

obtain a user context from a 2nd/3rd generation (2/3G) gateway based on the tracking area update request message; and switch a bearer of the user equipment from the 2/3G gateway to a 4G gateway based on the user context.

18. The mobility management device according to claim 12, wherein the processor executes the instructions further to:

obtain a user context from a 2nd/3rd generation (2/3G) gateway based on the tracking area update request message; and switch a bearer of the user equipment from the 2/3G gateway to a 4G gateway based on the user context.

19. A communication system, comprising:

a 5th generation (5G) gateway; and a mobility management device configured to:

receive a tracking area update request message for a 4th generation (4G) network from a user equipment, wherein the tracking area update request message carries a user identifier and a 5G capability of the user equipment;

determine, based on the user identifier, that a user is a 5G user;

trigger the user equipment to attach to the 4G network;

receive an attach request from the user equipment;

select a 5G gateway for the user equipment responsive to the attach request; and establish a session with the 5G gateway.

20. The communication system according to claim 19, wherein the mobility management device is configured to trigger the user equipment to attach to the 4G network by detaching the user equipment.

\* \* \* \* \*